United States Patent [19]

Totsu

[11] 4,073,210
[45] Feb. 14, 1978

[54] SCREW

[76] Inventor: Katsuyuki Totsu, No. 4-7, 3-chome, Oshiage, Sumida, Tokyo, Japan

[21] Appl. No.: 721,940

[22] Filed: Sept. 10, 1976

[51] Int. Cl.² .......................................... F16B 23/00
[52] U.S. Cl. ...................................... 85/45; 145/50 R
[58] Field of Search ............... 85/45; 145/50 R, 50 A, 145/50 F

[56] References Cited

U.S. PATENT DOCUMENTS

| 2,015,878 | 10/1935 | Trotter | 85/45 X |
| 2,180,633 | 11/1939 | Holt | 85/45 |
| 2,258,326 | 10/1941 | Holt | 85/45 |
| 2,289,561 | 7/1942 | West | 85/45 |

FOREIGN PATENT DOCUMENTS

| 567,885 | 6/1958 | Belgium | 85/45 |
| 1,745 | 11/1889 | Switzerland | 85/45 |

Primary Examiner—Ramon S. Britts

[57] ABSTRACT

A screw is described having a head and a stem portion, the head portion having a slot formed therein of such shape as to ensure maximum surface engagement between a screwdriver bit and the side walls defining the slot. The bit of the screwdriver entering the slot has a shape complementary to that of the bottom wall defining the depth of the slot in the head portion.

4 Claims, 7 Drawing Figures

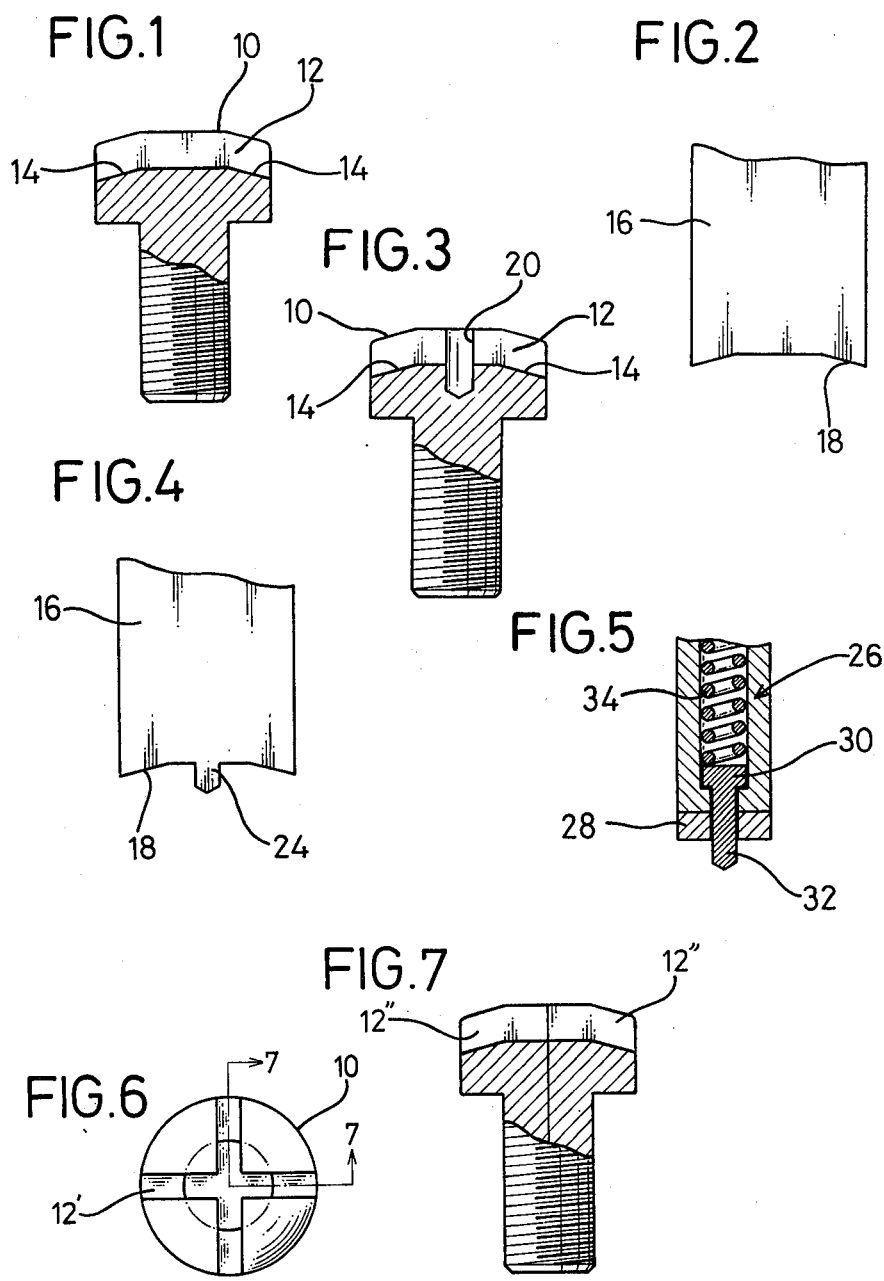

SCREW

BACKGROUND OF THE INVENTION

The present invention relates to threaded elements in particular screws and screwdrivers therefor.

Screws have been designed with various types of slot formations in the head portions thereof for engagement with the bit end of a screw driver for turning movement of the screw inward or outward relative to a cooperating element which itself may be threaded. Thus, screws have been provided in their head portions with diametral slots, the bottom depth defining walls of which lie in a common plane transverse to the axis of the screw.

Head portions of screws have also been formed with at least two diametral angularly related slots which intersect one another, the bottom depth defining walls of these slots also lying in a plane perpendicular to the screw axis. Whether one diametral or two diametral angularly related slots are provided in the head portion of the screw, in the tightening, and conversely loosening, of the screw with a screwdriver, torque applied with the screwdriver is essentially at the facing side walls, which together with the bottom wall define the slot. To obtain greater transmission of the driving torque from the driver bit to the screw, the surface area of contact between the driver bit and the side walls of the slot must be maximized.

SUMMARY OF THE INVENTION

Generally, in order to facilitate driving movement of a screw with a screwdriver, I predeterminedly shape the slot in the head portion of the screw to ensure maximum surface contact between the screwdriver bit and the side walls defining the slot, particularly at the opposite end portions of the slot where the driving torque is the greatest.

More particularly, this objective is obtained in accordance with the invention by providing a screw having a longitudinal axis and comprising a head portion having a peripheral surface symmetrical about the longitudinal axis and a stem protion extending from one face of the head portion along the axis, the head portion being formed in a face distant from the one face with a slot, of greater length than width, bounded by facing side walls and a bottom wall which determines the depth of the slot, the bottom wall of the slot comprising a horizontal section perpendicular to the axis and end sections forming extensions of the horizontal section from which the end sections downwardly diverge toward the one face.

Advantageously, the head portion in the mentioned distant face thereof may be formed with a second slot of the same shape as the slot described, the second slot being angularly related to the first slot. In a practical embodiment the slot (or slots) is formed in a diverging conical part which terminates in and merges with the cylindrical part of the head portion from which the stem portion extends. The slot in the conical part extends horizontally across the upper face thereof and angularly down the walls of the cone to the point of merger with the cylindrical part, the slot lying in a plane including the axis of the screw. Preferably, the bottom walls terminating the inclined slots are at an angle with respect to extensions of the bottom wall of the horizontal slotted part of from 8° to 15°.

For ready orientation of the bit of a screwdriver with a slot or slots thus formed I may include a central axially directed hole or passage extending from the upper face of the conical part into the cylindrical part but short of the stem portion of the screw, the diameter of the hole being greater than the width of the slot.

As noted, screwdrivers for screws slotted as above described must have a bit end contour which complements the shape of the walls defining the slot, in particular the bottom wall thereof. If a central axially extending passage is provided, as aforementioned, in association with a slot, the bit end will be formed with a projection of a shape corresponding to that of the passage. The projection may be telescopically mounted with respect to the bit end for reasons which will become apparent from the disclosure to follow.

The depth of the slot in the conical part is preferably designed to be equal to the depth of the horizontal interconnecting slot. Generally, the slope of the inclined slot is selected in relation to the interconnecting horizontal slotted part to ensure smooth entry into the slot preferably in positive contact with the surfaces defining the slot as a driver bit recessed to substantially conform with the shaped slot is inserted into the slot. Best results are achieved when the inclination is, as previously indicated, from 8° to 15° relative to the horizontally slotted part.

Objects and advantages of the invention will become apparent from the following disclosure taken in conjunction with the accompanying drawing showing illustrative embodiments of the invention. The principles of the invention apply to screws of any and all types of thread formations and accordingly it is not intended to limit the invention to the specific screw type shown in the drawing.

BRIEF DESCRIPTION OF THE DRAWINGS

FIG. 1 is a longtitudinal sectional view of a screw embodying the principles of this invention;

FIG. 2 is a front elevation of a screwdriver bit useable with the screwdriver shown in FIG. 1;

FIG. 3 is a longitudinal sectional view of a modified structure screw of the invention;

FIG. 4 is a front elevation of a screwdriver bit useable with the screw shown in FIG. 3;

FIG. 5 is a longitudinal sectional view of a screwdriver bit of modified construction;

FIG. 6 is a top plan view of a further modified screw structure of the invention; and FIG. 7 is a sectional along lines 7—7 of FIG. 6.

DESCRIPTION OF THE PREFERRED EMBODIMENTS

In FIG. 1, the screw of the present invention is shown in longitudinal section and has a head portion 10 formed with a slot 12 having a horizontally directed part and outwardly and downwardly sloping opposite ends 14. The inclination of the sloped ends 14 is selected to ensure ready fitting of a bit end to the slot and maximum surface engagement between the bit and the side walls of the slot.

In FIG. 2 is shown a screwdriver bit 16 which is recessed to conform to the shape of the slot shown in FIG. 1 and is accordingly formed with a horizontal recessed section, of a length conforming to the length of the horizontal slotted section, from the opposite ends of which horizontal recessed section project triangular sections 18 as seen in FIG. 2. The slope of the inner facing surfaces of the triangular section substantially matches the slope of the inclined slot sections in the head portion of the screw.

In FIG. 3, the head portion 10 is provided at its mid portion with a substantially cylindrical hole 20 having a diameter larger than the width of the slot 12 and a depth which does not penetrate the stem portion of the screw. As best shown in FIG. 4, a recessed edge 18 of the screwdriver bit is provided with a guide projection 24 for use with the screw as shown in FIG. 3. As, with the bit of FIG. 2, the shape of edge 18 conforms to the shape of the bottom depth defining wall of the slot and is thus complementarily shaped with respect thereto.

In FIG. 5, the screwdriver sleeve 26 is shown provided at its end with a bit 28, it being understood that the bit will be shaped to conform to the shape of the slot in which it is to be applied. Since the structure of FIG. 5 primarily involves the resilient mounting of a projection intended for insertion in the hole 20, (see FIG. 3), the bit in FIG. 5 has simply been shown with a planar bottom face for ease of representation. As shown in FIG. 5, in the center of the bit there is telescopically provided a cylindrical projection 32 having at its one end a flange 30 engaged by a spring 34. With this arrangement the driver bit can be fitted into the shaped slot formation in the head portion of the screw even if the depth of the cylindrical hole 20 is not coincident with the length of the projection 32 since if the latter is longer than the hole it will be pressed inwardly against the bias of the spring 34. A screwdriver thus constructed may also be used to drive a screw which has no hole formed in the screw.

FIG. 6 shows a top plan view of a modified screw construction and FIG. 7 shows a section of the modified construction taken through lines 6—6 of FIG. 6. Except for use of two slots instead of one as shown in the other figures, this embodiment is similar to those previously described in that the slot formations are similarly formed in the conical part of the head portion which slots in the conical part terminate at the cylindrical part of the screw from which the stem portion projects. As will be seen from FIGS. 6 and 7 the slots 12' and 12" are angularly related to each other. Preferably, the slots are perpendicularly related.

The screw-screwdriver combination of the invention thus fulfills the object of increasing the areas through which the driving torque may be transmitted thereby facilitating driving action of the screw without danger of stripping its threads and also prevents damage to the side walls defining the slot, particularly at its ends since slippage in the slot, which might otherwise occur, is prevented.

While the invention has been shown and described with reference to a preferred embodiment, it will be understood by those skilled in the art that various changes in form and detail may be made therein without departing from the spirit and scope of the invention defined in the appended claims.

What is claimed is:

1. A screw having a longitudinal axis and comprising a head portion having a peripheral surface symmetrical about said longitudinal axis and a stem portion extending from one face of the head portion along said axis, said head portion having a second face distant from said one face provided with at least one diametric slot of greater length than width, said slot being continuous entirely across said second face and open at the peripheral edges and being bounded by facing side walls and a bottom wall recessed below the surface of said second face determining the depth of the slot, the bottom wall of the slot comprising a horizontal central section perpendicular to said axis and end sections having a uniform slope forming opposed extensions to said horizontal section from which said end sections downwardly diverge at equal angles with respect to said axis toward said one face, the side walls of said slot bounding said side extensions having throughout their lengths a height relative to the bottom wall at least equal to the height of the side walls bounding the horizontal central section of said slot to thereby present side walls of continuous maximum area terminating at the outer radial extremities thereof.

2. A screw according to claim 1, wherein a second slot of the same shape as the first-named slot is formed in said distant face of said head portion, said second slot formation being angularly related to the first-named slot.

3. A screw according to claim 1, wherein the head portion near and distant from said stem portion is of cylindrical and conical form respectively, said conical form comprising a frustum of a cone converging from a cylindrical form toward said axis and having a first diameter end of diameter equal to the diameter of the cylindrical part of the head portion and a second opposed end of diameter smaller than said cylindrical part, said slot lying in a plane including said axis and extending centrally across said second smaller diameter end of the conical form and along the side walls thereof to the larger diameter end of the conical part.

4. A screw according to claim 3, wherein a central axially directed hole is formed in said head portion extending from said smaller diameter end of said conical form toward but short of said stem portion, said hole having a diameter larger than the width of the slot and intersecting the latter.

* * * * *